United States Patent
Bhashyam et al.

(10) Patent No.: US 11,983,226 B2
(45) Date of Patent: May 14, 2024

(54) REAL-TIME CRAWLING

(71) Applicant: Intuit Inc., Mountain View, CA (US)

(72) Inventors: Keshav Bhashyam, Bangalore (IN); Pradeep Srinivas Krishna, Bangalore (IN); Vijaykumar Hiremath, Bangalore (IN); Saikiran Sri Thunuguntla, Bangalore (IN)

(73) Assignee: Intuit Inc., Mountain View, CA (US)

( * ) Notice: Subject to any disclaimer, the term of this patent is extended or adjusted under 35 U.S.C. 154(b) by 66 days.

(21) Appl. No.: 17/555,117

(22) Filed: Dec. 17, 2021

(65) Prior Publication Data

US 2023/0195806 A1     Jun. 22, 2023

(51) Int. Cl.
*G06F 16/951* (2019.01)
*G06F 16/23* (2019.01)

(52) U.S. Cl.
CPC ........ *G06F 16/951* (2019.01); *G06F 16/2358* (2019.01)

(58) Field of Classification Search
CPC ............................ G06F 16/951; G06F 16/2358
See application file for complete search history.

(56) References Cited

U.S. PATENT DOCUMENTS

| | | | |
|---|---|---|---|
| 7,702,698 B1 * | 4/2010 | Chakravarthy | G06F 16/273 707/804 |
| 9,804,926 B1 * | 10/2017 | Robison | G06F 16/2358 |
| 10,425,350 B1 * | 9/2019 | Florissi | H04L 47/762 |
| 10,585,752 B1 * | 3/2020 | Chopra | G06F 11/1461 |
| 10,769,103 B1 * | 9/2020 | Patwardhan | G06F 16/128 |
| 11,238,049 B1 * | 2/2022 | James | G06F 16/24573 |
| 11,360,950 B2 * | 6/2022 | Harrison | G06F 16/254 |
| 11,461,294 B2 * | 10/2022 | Soza | G06F 16/235 |
| 11,487,700 B1 | 11/2022 | Per et al. | |
| 2017/0132429 A1 * | 5/2017 | Bell | H04L 9/0891 |
| 2018/0095952 A1 * | 4/2018 | Rehal | G06F 16/27 |
| 2018/0144015 A1 * | 5/2018 | Mittur Venkataramanappa | G06F 16/273 |
| 2019/0018880 A1 * | 1/2019 | Bendel | G06F 16/25 |
| 2020/0117680 A1 * | 4/2020 | Bapat | G06F 16/2358 |
| 2021/0011891 A1 * | 1/2021 | Soza | G06F 16/23 |

* cited by examiner

*Primary Examiner* — Miranda Le
(74) *Attorney, Agent, or Firm* — Paradice & Li LLP (57) ABSTRACT

Systems and methods for updating a data catalog in real-time with changes to metadata are disclosed. An example method may be performed by one or more processors of a system and include detecting changes to metadata in a metadata store, generating an event queue indicating a plurality of change events associated with system objects based on the changes, each of the plurality of change events indicating a number of event attributes and a system object associated with the change event, identifying recent events among the plurality of change events, identifying relevant events among the recent events, extracting unique identifiers from the relevant events, identifying priority objects among the system objects, obtaining, from the metadata store, current metadata for each of the priority objects, and updating information associated with the priority objects in a data catalog, the updating occurring in real-time with the changes to the metadata in the metadata store.

16 Claims, 3 Drawing Sheets

REAL-TIME CRAWLING

TECHNICAL FIELD

This disclosure relates generally to real-time crawling, and specifically to updating a data catalog in real-time with changes to metadata in a metadata store.

DESCRIPTION OF RELATED ART

Many organizations provide users access to a variety of documents, tables, and other system objects. Such organizations may store raw data corresponding to the system objects in a data repository, such as a data lake, and metadata indicative of attributes of the system objects in one or more databases, such as in a Hive Metastore (HMS) operating in conjunction with the data repository. For some organizations, the number of system objects—and thus, the amount of metadata—becomes so large that the system and users waste considerable amounts of time and resources managing the metadata. In an attempt to remedy this issue, some organizations implement a metadata registry (or data catalog), whereby users may more efficiently manage the metadata, among other data assets, in one location.

However, as the number of system objects increases—and thus, the amount of metadata—so does the time required to synchronize the information in the data catalog with the information corresponding to the system objects in the HMS, such as during a bootstrap operation or a delta process. If the number of system objects is on the order of thousands or more, the information in the data catalog may become significantly out-of-sync with the information in the HMS, such as by hours or days, which may result in errors when users execute operations based on the out-of-sync information. In some cases, manual intervention and/or system downtime may be required to resolve the inconsistencies. Although various event detection functions (such as webhooks) could be implemented to partially mitigate these issues, such functions tend to operate only within their corresponding runtime environments (such as Hive for Hive-based webhooks), and are thus unable to process changes made to system objects via different runtime engines, such as Spark, Databricks, Athena, Redshift, Impala, or the like.

Therefore, it is desirable for computer-based systems to minimize the amount of time between changes that occur in a metadata store and corresponding information in a data catalog being updated. Furthermore, it is desirable for computer-based systems to operate in a runtime engine agnostic manner.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for updating a data catalog in real-time with changes to metadata. An example method may be performed by one or more processors of a crawling system and include detecting changes to metadata in a metadata store, generating, based on the detected changes, an event queue indicating a plurality of change events associated with system objects, each respective change event of the plurality of change events indicating a system object associated with the respective change event and a number of event attributes of the respective change event, identifying recent events among the plurality of change events based on a first event attribute of the number of event attributes, identifying relevant events among the recent events based on a second event attribute of the number of event attributes, extracting unique identifiers from the relevant events based on a third event attribute of the number of event attributes, identifying priority objects among the system objects based on the unique identifiers, obtaining, from the metadata store, current metadata for each of the priority objects, and updating information associated with the priority objects in a data catalog based on the current metadata, the updating occurring in real-time with the changes to the metadata in the metadata store.

In some implementations, the method may further include storing raw system data corresponding to the system objects in a data repository, where the data repository is a data lake. In some aspects, the metadata is indicative of attributes of the system objects, where the metadata store is a relational database, where the system objects include one or more tables, and where the metadata associated with a respective table indicates at least one of a location of the respective table, a number of columns in the respective table, a type of the respective table, a type of data stored in the respective table, a number of partitions in the respective table, a name of the respective table, a unique identifier for the respective table, a creator of the respective table, or a creation time of the respective table. In some instances, the changes to the metadata are responsive to at least one command issued on the metadata store, where detecting the changes includes monitoring a change log generated by the metadata store, where the change log is a binary log.

In some aspects, the first event attribute is indicative of a time that the respective change event occurred, where the first event attribute is a timestamp, where each of the recent events occurs during a specified time window, and where identifying the recent events includes identifying a most recent timestamp within the specified time window. In some other aspects, the second event attribute is indicative of a type of the respective change event, where each of the relevant events is of a drop event type, an alter event type, or a create event type, and where identifying the relevant events includes filtering irrelevant events from the recent events, where each of the irrelevant events is not of the drop event type, alter event type, or create event type. In some aspects, the third event attribute is indicative of an identifier for the system object associated with the respective change event, where the identifier is a primary key, where each of the unique identifiers extracted from the relevant events is associated with a different one of the system objects, and where extracting the one or more unique identifiers from the relevant events includes grouping the relevant events according to the third event attribute, selecting one relevant event from each respective group of relevant events, where the one relevant event is a most recent event in the respective group of relevant events, and where the most recent event is identified based on the first event attribute, and extracting the third event attribute from each of the selected relevant events.

In some other implementations, identifying the priority objects includes providing the unique identifiers to an extraction engine, where a metadata crawling operation of the extraction engine is initiated responsive to the providing, and determining, using the extraction engine, a metadata location for the system objects based on the unique identifiers, where obtaining the current metadata is based on the determining. In some instances, obtaining the current metadata includes refraining from obtaining metadata for system objects not included among the priority objects. In some other instances, the data catalog is a metadata registry, where the metadata registry provides an interface for managing at least the metadata in the metadata store.

Another innovative aspect of the subject matter described in this disclosure can be implemented in a system. An example system may include one or more processors and a memory storing instructions for execution by the one or more processors. Execution of the instructions may cause the system to perform operations including detecting changes to metadata in a metadata store, generating, based on the detected changes, an event queue indicating a plurality of change events associated with system objects, each respective change event of the plurality of change events indicating a system object associated with the respective change event and a number of event attributes of the respective change event, identifying recent events among the plurality of change events based on a first event attribute of the number of event attributes, identifying relevant events among the recent events based on a second event attribute of the number of event attributes, extracting unique identifiers from the relevant events based on a third event attribute of the number of event attributes, identifying priority objects among the system objects based on the unique identifiers, obtaining, from the metadata store, current metadata for each of the priority objects, and updating information associated with the priority objects in a data catalog based on the current metadata, the updating occurring in real-time with the changes to the metadata in the metadata store.

In some implementations, execution of the instructions may cause the system to perform operations further including storing raw system data corresponding to the system objects in a data repository, where the data repository is a data lake. In some aspects, the metadata is indicative of attributes of the system objects, where the metadata store is a relational database, where the system objects include one or more tables, and where the metadata associated with a respective table indicates at least one of a metadata location for the respective table, a number of columns in the respective table, a type of the respective table, a type of data stored in the respective table, a number of partitions in the respective table, a name of the respective table, a unique identifier for the respective table, a creator of the respective table, or a creation time of the respective table. In some instances, the changes to the metadata are responsive to at least one command issued on the metadata store, where detecting the changes includes monitoring a change log generated by the metadata store, where the change log is a binary log.

In some aspects, the first event attribute is indicative of a time that the respective change event occurred, where the first event attribute is a timestamp, where each of the recent events occurs during a specified time window, and where identifying the recent events includes identifying a most recent timestamp within the specified time window. In some other aspects, the second event attribute is indicative of a type of the respective change event, where each of the relevant events is of a drop event type, an alter event type, or a create event type, and where identifying the relevant events includes filtering irrelevant events from the recent events, where each of the irrelevant events is not of the drop event type, alter event type, or create event type. In some aspects, the third event attribute is indicative of an identifier for the system object associated with the respective change event, where the identifier is a primary key, where each of the unique identifiers extracted from the relevant events is associated with a different one of the system objects, and where extracting the one or more unique identifiers from the relevant events includes grouping the relevant events according to the third event attribute, selecting one relevant event from each respective group of relevant events, where the one relevant event is a most recent event in the respective group of relevant events, and where the most recent event is identified based on the first event attribute, and extracting the third event attribute from each of the selected relevant events.

In some other implementations, identifying the priority objects includes providing the unique identifiers to an extraction engine, where a metadata crawling operation of the extraction engine is initiated responsive to the providing, and determining, using the extraction engine, a metadata location for the system objects based on the unique identifiers, where obtaining the current metadata is based on the determining. In some instances, obtaining the current metadata includes refraining from obtaining metadata for system objects not included among the priority objects. In some other instances, the data catalog is a metadata registry, where the metadata registry provides an interface for managing at least the metadata in the metadata store.

Another innovative aspect of the subject matter described in this disclosure can be implemented as a non-transitory computer-readable medium storing instructions that, when executed by one or more processors of a system, cause the system to perform operations. Example operations may include detecting changes to metadata in a metadata store, generating, based on the detected changes, an event queue indicating a plurality of change events associated with system objects, each respective change event of the plurality of change events indicating a system object associated with the respective change event and a number of event attributes of the respective change event, identifying recent events among the plurality of change events based on a first event attribute of the number of event attributes, identifying relevant events among the recent events based on a second event attribute of the number of event attributes, extracting unique identifiers from the relevant events based on a third event attribute of the number of event attributes, identifying priority objects among the system objects based on the unique identifiers, obtaining, from the metadata store, current metadata for each of the priority objects, and updating information associated with the priority objects in a data catalog based on the current metadata, the updating occurring in real-time with the changes to the metadata in the metadata store.

In some implementations, execution of the instructions may cause the system to perform operations further including storing raw system data corresponding to the system objects in a data repository, where the data repository is a data lake. In some aspects, the metadata is indicative of attributes of the system objects, where the metadata store is a relational database, where the system objects include one or more tables, and where the metadata associated with a respective table indicates at least one of a location of the respective table, a number of columns in the respective table, a type of the respective table, a type of data stored in the respective table, a number of partitions in the respective table, a name of the respective table, a unique identifier for the respective table, a creator of the respective table, or a creation time of the respective table. In some instances, the changes to the metadata are responsive to at least one command issued on the metadata store, where detecting the changes includes monitoring a change log generated by the metadata store, where the change log is a binary log.

In some aspects, the first event attribute is indicative of a time that the respective change event occurred, where the first event attribute is a timestamp, where each of the recent events occurs during a specified time window, and where identifying the recent events includes identifying a most recent timestamp within the specified time window. In some other aspects, the second event attribute is indicative of a type of the respective change event, where each of the relevant events is of a drop event type, an alter event type, or a create event type, and where identifying the relevant events includes filtering irrelevant events from the recent events, where each of the irrelevant events is not of the drop event type, alter event type, or create event type. In some aspects, the third event attribute is indicative of an identifier for the system object associated with the respective change event, where the identifier is a primary key, where each of the unique identifiers extracted from the relevant events is associated with a different one of the system objects, and where extracting the one or more unique identifiers from the relevant events includes grouping the relevant events according to the third event attribute, selecting one relevant event from each respective group of relevant events, where the one relevant event is a most recent event in the respective group of relevant events, and where the most recent event is identified based on the first event attribute, and extracting the third event attribute from each of the selected relevant events.

In some other implementations, identifying the priority objects includes providing the unique identifiers to an extraction engine, where a metadata crawling operation of the extraction engine is initiated responsive to the providing, and determining, using the extraction engine, a metadata location for the system objects based on the unique identifiers, where obtaining the current metadata is based on the determining. In some instances, obtaining the current metadata includes refraining from obtaining metadata for system objects not included among the priority objects. In some other instances, the data catalog is a metadata registry, where the metadata registry provides an interface for managing at least the metadata in the metadata store.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

As described above, it is desirable for computer-based systems to minimize the amount of time between changes in a metadata store and corresponding updates in a data catalog. Implementations of the subject matter described in this disclosure may be used in synchronizing or otherwise updating a data catalog, in a runtime engine agnostic manner, in real-time with changes to the corresponding metadata in a metadata store.

Specifically, implementations of the subject matter described in this disclosure may be used in updating the data catalog based on identifying system objects that have recently undergone a high-priority change event in a data repository, and activating an on-demand crawling operation for obtaining, from a metadata store operating in conjunction with the data repository, current metadata for the identified system objects, regardless of the runtime engine used to affect the changes, as further described below. In these and other manners, implementations of the subject matter described in this disclosure may provide one or more benefits such as updating a data catalog in real-time with changes to metadata associated with system objects, identifying relevant change events, identifying priority system objects, obtaining current metadata for priority system objects, operating in a runtime engine agnostic manner, improving user experience, enhancing workflow, reducing system errors, reducing user time and effort, reducing system downtime and manual interventions, reducing system processing and memory resources, reducing project turnaround times, increasing user retention, and so on.

For purposes of discussion herein, a "system" may refer to any appropriate system for detecting changes to metadata, generating an event queue, identifying recent and/or relevant change events, extracting unique identifiers from change events, identifying priority system objects, obtaining current metadata for system objects, updating a data catalog, and the like.

For purposes of discussion herein, a "system object" may generally refer to one or more hive entities associated with a Hive Metastore (HMS), such as a hive table, a hive column, a hive row, or the like, but it is to be understood that this disclosure is not limited thereto. For example, in some implementations not shown, a "system object" may refer to any appropriate electronic file, data asset, or object accessible by a system user, including but not limited to a listing of machine learning features, a relational dataset, a data lake dataset, a Kafka topic, a message feed, a schema, a blueprint, an application, a table, a stream processor, a software platform, a glossary, a glossary term, an account, a calculator, an entity, an event, an interface, a map, a server, a team, or the like. In some aspects, a system object may include a webpage, an image, a video, an audio file, a discussion thread, a communication interface, or the like. A system object may be associated with (or otherwise "include") one or more fields (or "metadata fields") storing values (or "metadata values") indicative of attributes of the system object, where the values may be generated automatically and/or manually entered by a human. As used herein, a system object "having" a metadata value or being "associated with" particular metadata may refer to a system object associated with a metadata field storing the particular metadata value. In some instances, a metadata field may not include a value or may include a NULL value.

For purposes of discussion herein, an "attribute" of a system object or a change event associated with the system object may refer to any appropriate technical parameter or characteristic associated with the system object or the change event, including but not limited to a time that the change event occurred, a timestamp associated with the change event, a type of the change event, a parameter key value for the change event, a position of the change event within a series of change events, a sequence number associated with the change event, a location of metadata for the system object, a classification of the system object, a creation time for the system object, a creator of the system object, a most recent update time for the system object, a most recent updater of the system object, a most recent time that the system object incurred a particular type of change (e.g., a Data Definition Language (DDL) change), a term within the system object, an account number associated with the system object, a number of columns in the system object, at least one column name within the system object, a most recent access time for the system object, a most recent write time for the system object, a name of the system object, a qualified or unique identifier for the system object, a number of files associated with the system object, a retention of the system object, a number of partitions associated with the system object, a storage location for the system object, a source type of the system object, a standardized name for the system object, a table type associated with the system object, a data type associated with the system object, a value of the system object, a temporary status associated with the system object, an audit associated with the system object, a schema or schema change associated with the system object, a number of rows in the system object, a refresh time for the system object, a column partition associated with the system object, an administrator for the system object, one or more users of the system object, or any other appropriate parameter or attribute associated with the system object.

For purposes of discussion herein, a "user" or "system user" may refer to a user of the system, and a user may "use the system" by affecting a change to a system object, issuing a command on the system, and/or accessing information in a data catalog associated with the system. A system user may affect system changes, issue system commands, or access system information via one or more appropriate sources, such as a device of the user (e.g., a smartphone, a tablet, a personal computer (PC), or a different suitable electronic device), a device communicatively coupled to and/or associated with the system, a data store (e.g., a memory, a database, an index, or the like), an interface (e.g., a user interface), an output of an algorithm, one or more computer-based modules or runtime engines, or any other suitable source.

Various implementations of the subject matter disclosed herein provide one or more technical solutions to the technical problem of improving the functionality of computer-based crawling systems, such as by updating, in a runtime engine agnostic manner, a data catalog in real-time with corresponding changes in a metadata store. Various aspects of the present disclosure provide specific steps describing how this specific result is accomplished and how this specific result realizes an improvement in computer functionality by means of a unique computing solution to a unique computing problem that did not exist prior to an electronic or online crawling system that can update a data catalog in real-time with changes in a metadata store in a runtime engine agnostic manner, which cannot be performed in the human mind, much less using pen and paper. As such, implementations of the subject matter disclosed herein provide meaningful improvements to the performance of computer-based crawling systems.

Figure 1:
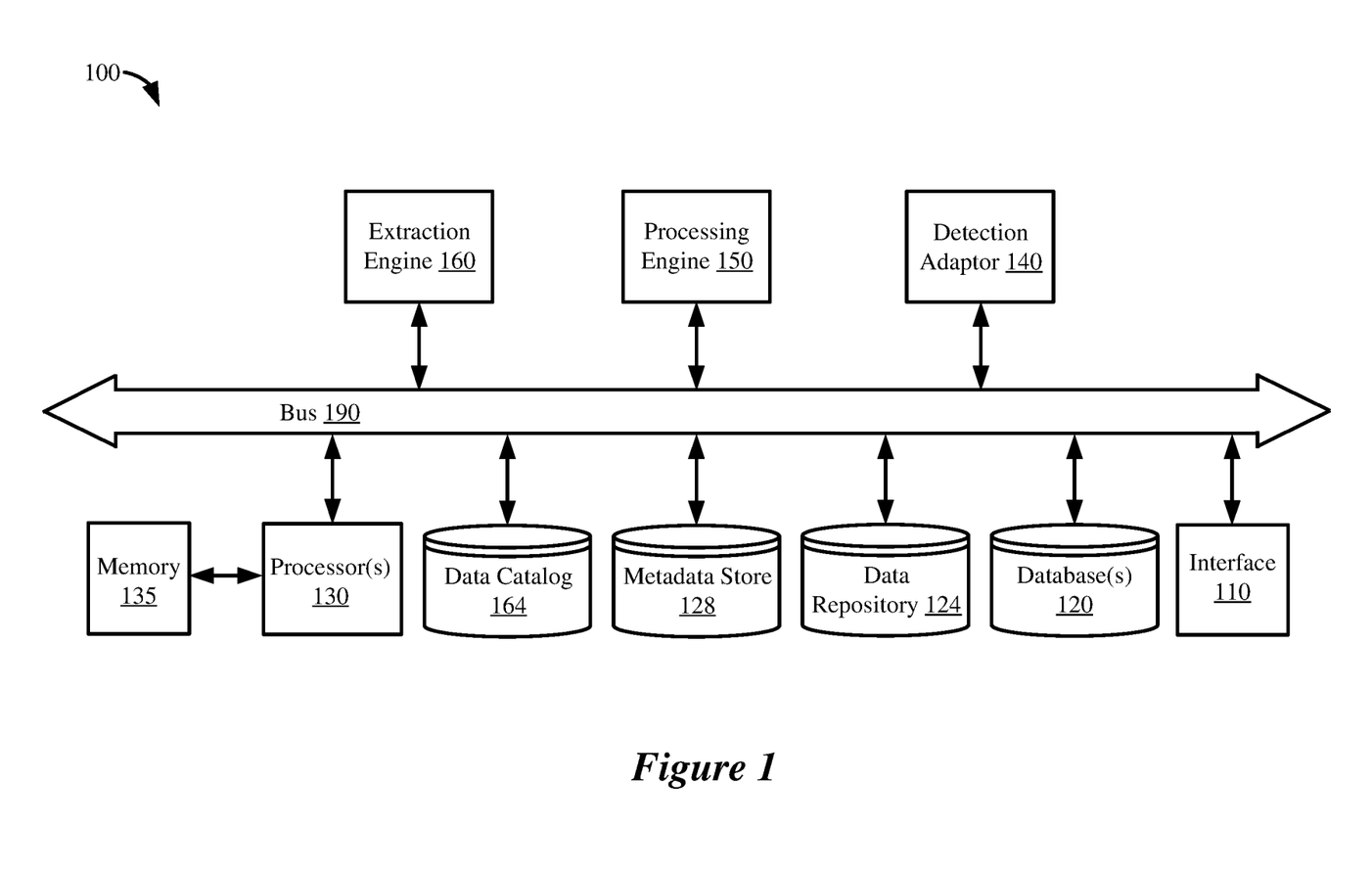
FIG. 1 shows a crawling system, according to some implementations.

FIG. 1 shows a crawling system 100, according to some implementations. The crawling system 100 may also be referred to herein as "the system 100." Various aspects of the system 100 disclosed herein may be generally applicable for updating a data catalog in real-time with changes to metadata. The system 100 includes an interface 110, one or more databases 120, a data repository 124, a metadata store 128, one or more processors 130, a memory 135 coupled to the processor 130, a detection adaptor 140, a processing engine 150, an extraction engine 160, a data catalog 164, and a crawling engine 180. In some implementations, the various components of the system 100 are interconnected by at least a data bus 190, as depicted in the example of FIG. 1. In some other implementations, the various components of the system 100 are interconnected using other suitable signal routing resources. While the system 100 and the examples herein are described with reference to crawling metadata changes, the system 100 and aspects of the present disclosure may be used for crawling other suitable electronic data structures, among other suitable tasks.

The interface 110 may be one or more input/output (I/O) interfaces for receiving input data, such as a database query entered by a system user (or "user"). The interface 110 may also be used to provide information associated with a plurality of system objects, such as metadata indicative of attributes of the system objects. For example, the system 100 may detect changes to the metadata in the metadata store 128, seamlessly update corresponding information in the data catalog 164, and use the interface 110 to provide a user with the corresponding information in at least near real-time with the detected changes. The interface 110 may also be used to provide or receive other suitable information, such as computer code for updating one or more programs stored on the system 100, internet protocol requests and results, or the like. An example interface may include a wired interface or wireless interface to the internet or other means to communicably couple with user devices or any other suitable devices. For example, the interface 110 may include an interface with an ethernet cable to a modem, which is used to communicate with an internet service provider (ISP) directing traffic to and from user devices and/or other parties. The interface 110 may also be used to communicate with another device within the network to which the system 100 is coupled, such as a smartphone, a tablet, a personal computer, or other suitable electronic device. The interface 110 may also include a display, a speaker, a mouse, a keyboard, or other suitable input or output elements that allow interfacing with the system 100 by a local user or moderator.

The database 120 may store any data associated with the system 100, such as one or more database queries, one or more system objects, JSON (JavaScript Object Notation) files, or any other appropriate data. The database 120 may be a part of or separate from the data repository 124, the metadata store 128, the data catalog 164, and/or another appropriate physical or cloud-based data store. In some implementations, the database 120 may include a relational database capable of presenting information as data sets in tabular form and capable of manipulating the data sets using relational operators. The database 120 may use Structured Query Language (SQL) for querying and maintaining the database 120. The input data and the data sets described below may be in any suitable format for processing by the system 100. For example, the data may be included in one or more JSON files or objects. In another example, the data may be in SQL compliant data sets for filtering and sorting by the system 100 (such as by the processor 130).

The data repository 124 may store raw system data corresponding to the system objects. The data repository 124 may be a data lake or another appropriate repository for storing data in raw format. In some instances, the data repository 124 includes data stored in one or more cloud object storage services, such as one or more Amazon Web Services (AWS)-based Simple Storage Service (S3) buckets. In some implementations, all or a portion of the raw system data may be stored in a memory separate from the data repository 124. The data repository 124 may be a part of or separate from the database 120, the metadata store 128, the data catalog 164, and/or another appropriate physical or cloud-based data store.

The metadata store 128 may store metadata indicative of attributes of the system objects. The metadata store 128 may be a relational database. In some implementations, the metadata store 128 is a Hive Metastore (HMS). As a non-limiting example, a system object may be a table, and the metadata associated with the system object may indicate one or more of a location of the table, a number of columns in the table, a type of the table, a type of data stored in the table, a number of partitions in the table, a name of the table, a unique identifier for the table, a creator of the table, a creation time of the table, or any number of other appropriate attributes of the table. In some instances, the metadata associated with a system object may change, such as in response to a command issued on the metadata store 128, and the metadata store 128 may generate a record of the change in a change log, such as a binary log or another appropriate log. In some implementations, the metadata store 128 generates the change log based on one or more change data capture (CDC) processes, as further described in connection with the detection adaptor 140.

The processor 130 may include one or more suitable processors capable of executing scripts or instructions of one or more software programs stored in system 100, such as within the memory 135. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 130 may include a combination of computing devices, such as a combination of a DSP and a microprocessor, a plurality of microprocessors, one or more microprocessors in conjunction with a DSP core, or any other suitable configuration.

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The detection adaptor 140 may be used to detect changes within the metadata store 128. In some implementations, the detection adaptor 140 may incorporate aspects of a CDC source connector, such as a MySQL Debezium adaptor, or the like. For example, the detection adaptor 140 may detect the changes by directly monitoring the change log generated by the metadata store 128 based on one or more CDC processes. In this manner, the detection adaptor 140 may seamlessly detect changes made to the system objects in the data repository 124, regardless of the runtime engine used to affect the changes to the system objects—that is, the detection adaptor 140 is runtime engine agnostic.

The detection adaptor 140 may also be used to generate, or otherwise publish, an event queue indicating a respective "change event" for each of the detected changes. In some implementations, the event queue may incorporate aspects of a Kafka-based event bus topic. The event queue may indicate a number of attributes for each respective change event, such as an identifier of a system object associated with the respective change event. Other non-limiting examples of event attributes include a time that the respective change event occurred, a type of the respective change event, a metadata location for the system object associated with the respective change event, and/or any other appropriate attribute of the respective change event. The detection adaptor 140 may provide the event queue to the processing engine 150 for further processing.

The processing engine 150 may be used to identify recent events among the change events listed in the event queue, such as based on a first event attribute of the number of event attributes, where the first event attribute may be indicative of a time that the respective change event occurred. In some implementations, the processing engine 150 is one or more of a stream processor, a stream processing application, or a stream processing or Kafka consumer. In some implementations, the processing engine 150 may identify the recent events based on determining which of the change events occurred during a specified time window, such as by identifying one or more most recent timestamps associated with the change events. For example, if a given system object (such as a table) incurs three change events within the specified time window (such as three rows being added to the table relatively close in-time), and the first event attribute for the first event is timestamp=1630639694000, the first event attribute for the second event is timestamp=1630639695000, and the first event attribute for the third event is timestamp=1630639696000, the processing engine 150 may determine that the third event is the most recent change event for the given system object. By identifying the most recent change event based on the timestamps, the processing engine 150 may deduplicate, or otherwise refrain from processing, the less recent change events for the system object, thereby increasing an efficiency at which a metadata crawling operation of the system may be executed, as further described below in connection with the extraction engine 160.

The processing engine 150 may also be used to identify relevant events among the recent events, such as based on a second event attribute of the number of event attributes, where the second event attribute may be indicative of a type of the respective recent event. In some implementations, the system 100 prioritizes incorporating change events of a specified type ("relevant" events) into the data catalog 164, such as schema change events or Data Definition Language (DDL) change events (e.g., a drop event, an alter event, a create event, or the like), and refrains from prioritizing change events not of the specified type ("irrelevant" events), such as Data Manipulation Language (DML) change events (e.g., an update event, an insert event, a delete event, or the like), and the processing engine 150 may identify the relevant events based on filtering the irrelevant events from the recent events. In some instances, the second event attribute indicates a parameter key value for the corresponding change event, and the processing engine 150 identifies the relevant events based on whether the parameter key value is one of a specified set of relevant parameter key values. In some other instances, the second event attribute is indicative of a most recent time that the corresponding system object incurred a DDL change, and the processing engine 150 identifies the relevant events based on whether the event indicates an update to the most recent time. For example, if the second event attribute is PARAM_KEY=transient_lastDDLTime, PARAM_VALUE=1630639681—i.e., the time of the most recent DDL change for the corresponding system object is being updated to 1630639681—the processing engine 150 may determine that the corresponding system object has incurred a DDL change, and thus, deem the respective change event as relevant. In some instances, if the respective change event does not include an update to the most recent time, the processing engine 150 may refrain from determining that the respective change event is relevant, or otherwise determine that the respective change event is irrelevant. In these manners, the processing engine 150 may conserve resources by prioritizing the incorporation of relevant events into the data catalog 164, and refraining from prioritizing the incorporation of irrelevant events into the data catalog 164.

The processing engine 150 may also be used to extract unique identifiers from the relevant events, such as based on a third event attribute of the number of event attributes, where the third event attribute may be indicative of a unique identifier for the system object associated with the respective relevant event. For example, each unique identifier may be a primary key indicative of a metadata location associated with the system object in the metadata store 128, and the processing engine 150 may extract the unique identifiers based on grouping or otherwise sorting the relevant events according to the unique identifiers, selecting one relevant event (such as a most recent relevant event) from each group, and extracting the unique identifier from each of the selected events. In this manner, the processing engine 150 may deduplicate the relevant events based on generating a list of identifiers uniquely identifying system objects associated with at least one recent, high-priority change event (i.e., "priority" system objects). In some implementations, the processing engine 150 may provide the unique identifiers to the extraction engine 160 for further processing.

The extraction engine 160 may be used to obtain, from the metadata store 128, current metadata for each of the priority objects, such as upon receiving the unique identifiers from the processing engine 150, and thus may operate as an on-demand metadata crawler, such as an on-demand Hive crawler if the metadata store 128 is an HMS. For example, upon invocation by the processing engine 150, the extraction engine 160 may determine a metadata location in the metadata store 128 for each of the priority objects, such as based on the unique identifiers, and execute a metadata crawling operation for obtaining, from the metadata locations, current metadata for each of the priority objects. In some aspects, the extraction engine 160 may also obtain unchanged metadata for the priority objects. The extraction engine 160 may refrain from obtaining metadata for system objects not included among the priority objects (i.e., the "non-priority" objects) during the metadata crawling operation.

The extraction engine 160 may also be used to update information (e.g., registry values) associated with the priority objects in the data catalog 164, such as immediately upon (e.g., within seconds of) obtaining the current metadata from the metadata store 128. In this manner, the extraction engine 160 may update the data catalog 164 in at least near real-time with the high-priority changes to the system objects, and refrain from wasting valuable time and processing resources to identify, obtain, transfer, and update information related to unchanged system objects and/or low-priority changes to system objects. In some aspects, the extraction engine 160 may also update the data catalog 164 with the unchanged metadata associated with the priority objects, such as in an idempotent manner. By updating the data catalog in real-time with the changes in the metadata store, the extraction engine 160 may reduce or even eliminate system errors caused by the information being out-of-sync, thus allowing computer- and human-based resources to be repurposed for other tasks.

The data catalog 164 may be a metadata registry for managing metadata, such as the metadata in the metadata store 128 associated with the system objects in the data repository 124. In some instances, a user may access and/or manage the metadata in the data catalog 164 via the interface 110. In some implementations, the data catalog 164 is implemented using one or more metadata management systems, such as Apache Atlas, Google Data Catalog, or the like. In some instances, the data catalog 164 also stores various documentation and/or other metadata. By updating the data catalog 164 in real-time with changes in the metadata store 128, aspects of the present disclosure may seamlessly provide the user with accurate information about the corresponding system objects in real-time with the changes.

The detection adaptor 140, the processing engine 150, and the extraction engine 160 may be implemented in software, hardware, or a combination thereof. In some implementations, any one or more of the detection adaptor 140, the processing engine 150, or the extraction engine 160 may be embodied in instructions that, when executed by the processor 130, cause the system 100 to perform operations. The instructions of one or more of the components 140-160 and/or one or more of the data repository 124, the metadata store 128, or the data catalog 164 may be stored in the memory 135, the database 120, or a different suitable memory. The instructions may be in any suitable programming language format for execution by the system 100, such as by the processor 130. It is to be understood that the particular architecture of the system 100 shown in FIG. 1 is but one example of a variety of different architectures within which aspects of the present disclosure may be implemented. For example, in some other implementations, components of the system 100 may be distributed across multiple devices, included in fewer components, and so on. While the below examples of updating a data catalog in real-time are described with reference to the system 100, any suitable system may be used.

Figure 2:
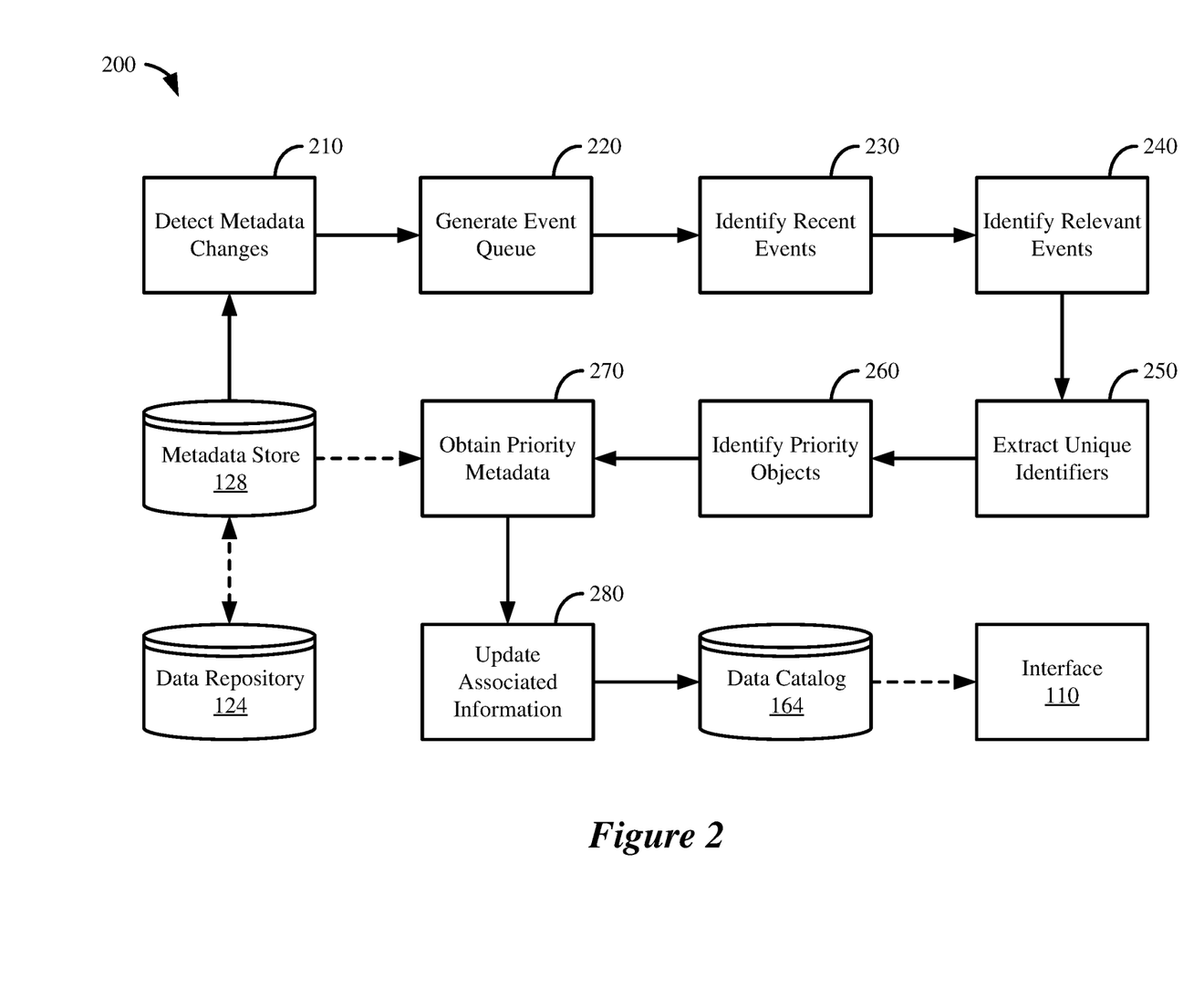
FIG. 2 shows a high-level overview of an example process flow that may be employed by the crawling system of FIG. 1, according to some implementations.

FIG. 2 shows a high-level overview of an example process flow 200 that may be employed by the system 100 of FIG. 1, according to some implementations, during which the extraction engine 160 in conjunction with the detection adaptor 140 and the processing engine 150 updates the data catalog 164 in real-time with changes in the metadata store 128.

Prior to block 210, raw system data corresponding to system objects is stored in the data repository 124, and metadata indicative of attributes of the system objects is stored in the metadata store 128. In some implementations, the data repository 124 is a data lake and the metadata store 128 is a relational database.

At block 210, the detection adaptor 140 detects changes to the metadata in the metadata store 128, such as based on monitoring a change log generated by the metadata store 128.

At block 220, the detection adaptor 140 generates an event queue indicating a respective change event for each detected change and a system object associated with the respective change event. The event queue may indicate a number of attributes for each change event, such as a time that the change event occurred, a type of the change event, a unique identifier for the system object associated with the change event, a metadata location for the system object associated with the change event, or the like. The detection adaptor 140 may provide the event queue to the processing engine 150.

At block 230, the processing engine 150 identifies recent events among the change events in the event queue, such as based on the times that the change events occurred.

At block 240, the processing engine 150 identifies relevant events among the recent events, such as based on whether the change events are DDL-type events.

At block 250, the processing engine 150 extracts unique identifiers from the relevant events, such as based on grouping the relevant events according to the unique identifiers, selecting one event from each group, and extracting the unique identifier from each of the selected events. The processing engine 150 may provide the unique identifiers to the extraction engine 160.

At block 260, the extraction engine 160 identifies the priority objects among the system objects, such as based on the unique identifiers.

At block 270, the extraction engine 160 obtains, for each respective priority object, current metadata from the corresponding metadata locations in the metadata store 128, where the extraction engine 160 determines the metadata locations based on the unique identifiers.

At block 280, the extraction engine 160 updates information associated with the priority objects in the data catalog 164, such as based on the current metadata obtained from the metadata store 128. In some implementations, the data catalog 164 may be a metadata registry, and a system user may access and/or manage the updated information in real-time with the corresponding changes to the metadata in the metadata store 128.

Figure 3:
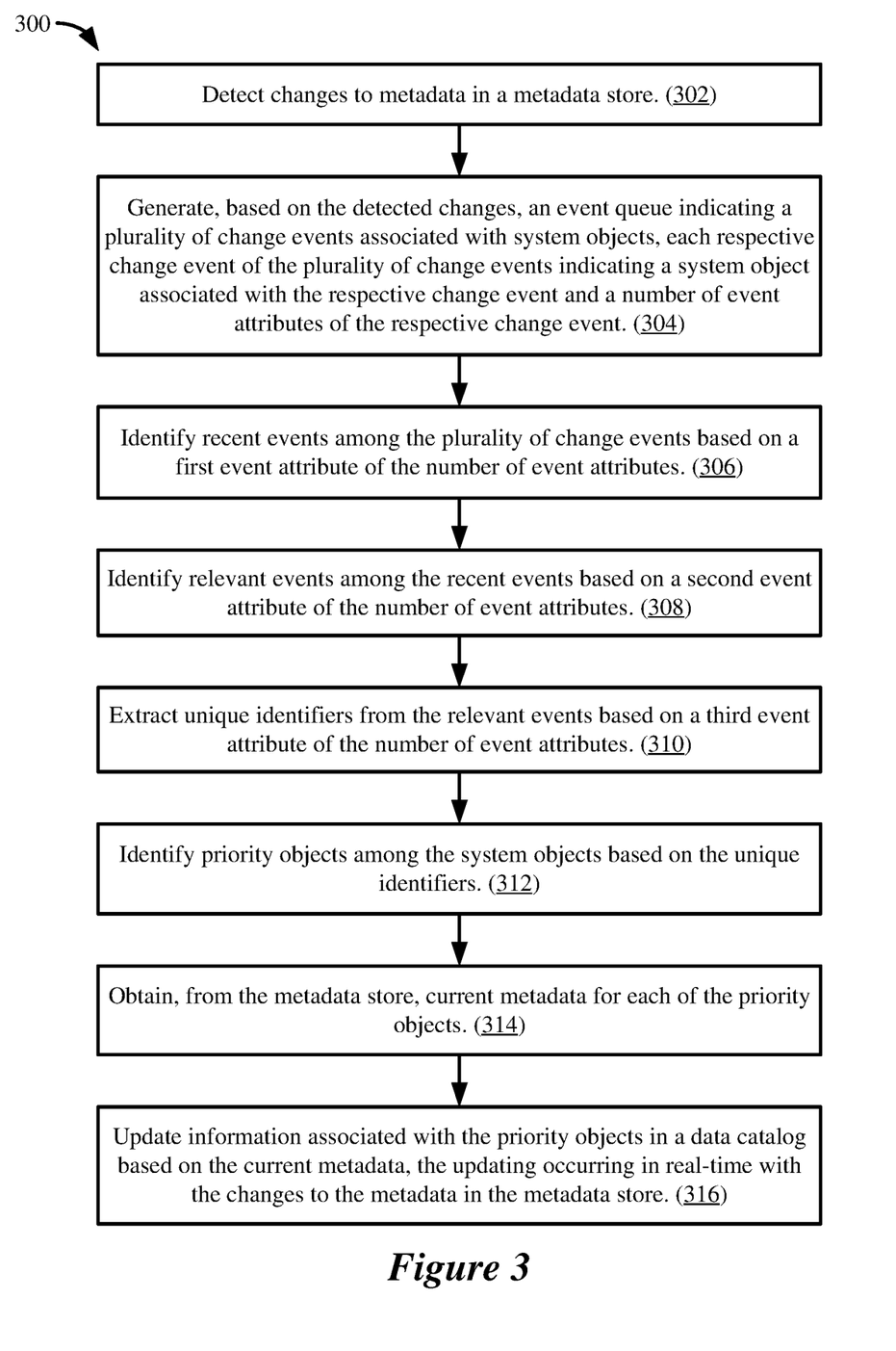
FIG. 3 shows an illustrative flowchart depicting an example operation for updating a data catalog in real-time, according to some implementations.

FIG. 3 shows an illustrative flowchart depicting an example operation 300 for updating a data catalog in real-time with changes to metadata, according to some implementations. The example operation 300 may be performed by one or more processors of a computing device in conjunction with an electronic crawling system. In some implementations, the example operation 300 may be performed using the system 100 of FIG. 1. It is to be understood that the example operation 300 may be performed by any suitable systems, computers, or servers.

At block 302, the system 100 detects changes to metadata in a metadata store. At block 304, the system 100 generates, based on the detected changes, an event queue indicating a plurality of change events associated with system objects, each respective change event of the plurality of change events indicating a system object associated with the respective change event and a number of event attributes of the respective change event. At block 306, the system 100 identifies recent events among the plurality of change events based on a first event attribute of the number of event attributes. At block 308, the system 100 identifies relevant events among the recent events based on a second event attribute of the number of event attributes. At block 310, the system 100 extracts unique identifiers from the relevant events based on a third event attribute of the number of event attributes. At block 312, the system 100 identifies priority objects among the system objects based on the unique identifiers. At block 314, the system 100 obtains, from the metadata store, current metadata for each of the priority objects. At block 316, the system 100 updates information associated with the priority objects in a data catalog based on the current metadata, the updating occurring in real-time with the changes to the metadata in the metadata store.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for updating a data catalog in real-time with changes to metadata, the method performed by one or more processors of a crawling system and comprising:
   detecting, using a relational database management system (RDBMS)-based adaptor, changes to metadata in a metadata store, the RDBMS-based adaptor incorporating one or more aspects of a change data capture (CDC) source connector;
   generating, based on the detected changes, an event queue indicating a plurality of change events associated with system objects, each respective change event of the plurality of change events indicating a system object associated with the respective change event and a number of event attributes of the respective change event, the event queue incorporating one or more aspects of an event bus topic associated with a stream processing application;
   storing raw system data corresponding to the system objects in a data repository, wherein the data repository is a data lake;
   identifying, using a consumer associated with the stream processing application, recent events among the plurality of change events based on a first event attribute of the number of event attributes, wherein the first event attribute is a timestamp indicative of a time that the respective change event occurred, wherein each of the recent events occurs during a specified time window, and wherein identifying the recent events includes identifying a most recent timestamp within the specified time window;
   identifying relevant events among the recent events based on a second event attribute of the number of event attributes;
   extracting unique identifiers from the relevant events based on a third event attribute of the number of event attributes;
   identifying priority objects among the system objects based on the unique identifiers, each of the priority objects associated with at least one of the recent events and at least one of the relevant events;
   selectively obtaining, from the metadata store, current metadata for ones of the system objects, the selectively obtaining including:
      obtaining current metadata for each of the system objects identified as priority objects; and
      refraining from obtaining current metadata for system objects that are not associated with at least one of the recent events and at least one of the relevant events; and
   updating registry values associated with the priority objects in a metadata registry immediately upon obtaining the current metadata from the metadata store, the updating occurring in at least near real-time with the changes to the priority objects corresponding to the detected changes to the metadata in the metadata store.

2. The method of claim 1, wherein the metadata is indicative of attributes of the system objects, wherein the metadata store is a relational database, wherein the system objects include one or more tables, and wherein the metadata associated with a respective table indicates at least one of a location of the respective table, a number of columns in the respective table, a type of the respective table, a type of data stored in the respective table, a number of partitions in the respective table, a name of the respective table, a unique identifier for the respective table, a creator of the respective table, or a creation time of the respective table.

3. The method of claim 1, wherein the changes to the metadata are responsive to at least one command issued on the metadata store, wherein detecting the changes includes:
   monitoring a change log generated by the metadata store, wherein the change log is a binary log.

4. The method of claim 1, wherein the second event attribute is indicative of a type of the respective change event, wherein each of the relevant events is of a drop event type, an alter event type, or a create event type, and wherein identifying the relevant events includes:
   filtering irrelevant events from the recent events, wherein each of the irrelevant events is not of the drop event type, alter event type, or create event type.

5. The method of claim 1, wherein the third event attribute is indicative of an identifier for the system object associated with the respective change event, wherein the identifier is a primary key, wherein each of the unique identifiers extracted from the relevant events is associated with a different one of the system objects, and wherein extracting the one or more unique identifiers from the relevant events includes:
   grouping the relevant events according to the third event attribute;
   selecting one relevant event from each respective group of relevant events, wherein the one relevant event is a most recent event in the respective group of relevant events, and wherein the most recent event is identified based on the first event attribute; and
   extracting the third event attribute from each of the selected relevant events.

6. The method of claim 1, wherein identifying the priority objects includes:
   providing the unique identifiers to an extraction engine, wherein a metadata crawling operation of the extraction engine is initiated responsive to the providing; and
   determining, using the extraction engine, a metadata location for the system objects based on the unique identifiers, wherein obtaining the current metadata is based on the determining.

7. The method of claim 1, wherein the metadata registry provides an interface for managing at least the metadata in the metadata store.

8. The method of claim 1, wherein the RDBMS is MySQL, wherein the CDC source connector is a Debezium adaptor, wherein the stream processing application is Kafka, wherein the event bus topic is a Kafka-based event bus topic, and wherein the consumer is a Kafka-based consumer.

9. The method of claim 1, wherein the updating further includes:
  updating the metadata registry based on unchanged metadata associated with the priority objects in an idempotent manner.

10. A system comprising:
  one or more processors; and
  at least one memory coupled to the one or more processors and storing instructions that, when executed by the one or more processors, cause the system to perform operations including:
    detecting, using a relational database management system (RDBMS)-based adaptor, changes to metadata in a metadata store, the RDBMS-based adaptor incorporating one or more aspects of a change data capture (CDC) source connector;
    generating, based on the detected changes, an event queue indicating a plurality of change events associated with system objects, each respective change event of the plurality of change events indicating a system object associated with the respective change event and a number of event attributes of the respective change event, the event queue incorporating one or more aspects of an event bus topic associated with a stream processing application;
    storing raw system data corresponding to the system objects in a data repository, wherein the data repository is a data lake;
    identifying, using a consumer associated with the stream processing application, recent events among the plurality of change events based on a first event attribute of the number of event attributes, wherein the first event attribute is a timestamp indicative of a time that the respective change event occurred, wherein each of the recent events occurs during a specified time window, and wherein identifying the recent events includes identifying a most recent timestamp within the specified time window;
    identifying relevant events among the recent events based on a second event attribute of the number of event attributes;
    extracting unique identifiers from the relevant events based on a third event attribute of the number of event attributes;
    identifying priority objects among the system objects based on the unique identifiers, each of the priority objects associated with at least one of the recent events and at least one of the relevant events;
    selectively obtaining, from the metadata store, current metadata for ones of the system objects, the selectively obtaining including:
      obtaining current metadata for each of the system objects identified as priority objects; and
      refraining from obtaining current metadata for system objects that are not associated with at least one of the recent events and at least one of the relevant events; and
    updating registry values associated with the priority objects in a metadata registry immediately upon obtaining the current metadata from the metadata store, the updating occurring in at least near real-time with the changes to the priority objects corresponding to the detected changes to the metadata in the metadata store.

11. The system of claim 10, wherein the metadata is indicative of attributes of the system objects, wherein the metadata store is a relational database, wherein the system objects include one or more tables, and wherein the metadata associated with a respective table indicates at least one of a location of the respective table, a number of columns in the respective table, a type of the respective table, a type of data stored in the respective table, a number of partitions in the respective table, a name of the respective table, a unique identifier for the respective table, a creator of the respective table, or a creation time of the respective table.

12. The system of claim 10, wherein the changes to the metadata are responsive to at least one command issued on the metadata store, wherein detecting the changes includes:
  monitoring a change log generated by the metadata store, wherein the change log is a binary log.

13. The system of claim 10, wherein the second event attribute is indicative of a type of the respective change event, wherein each of the relevant events is of a drop event type, an alter event type, or a create event type, and wherein identifying the relevant events includes:
  filtering irrelevant events from the recent events, wherein each of the irrelevant events is not of the drop event type, alter event type, or create event type.

14. The system of claim 10, wherein the third event attribute is indicative of an identifier for the system object associated with the respective change event, wherein the identifier is a primary key, wherein each of the unique identifiers extracted from the relevant events is associated with a different one of the system objects, and wherein extracting the one or more unique identifiers from the relevant events includes:
  grouping the relevant events according to the third event attribute;
  selecting one relevant event from each respective group of relevant events, wherein the one relevant event is a most recent event in the respective group of relevant events, and wherein the most recent event is identified based on the first event attribute; and
  extracting the third event attribute from each of the selected relevant events.

15. The system of claim 10, wherein identifying the priority objects includes:
  providing the unique identifiers to an extraction engine, wherein a metadata crawling operation of the extraction engine is initiated responsive to the providing; and
  determining, using the extraction engine, a metadata location for the system objects based on the unique identifiers, wherein obtaining the current metadata is based on the determining.

16. A non-transitory computer-readable medium storing instructions that, when executed by one or more processors of a system, cause the system to perform operations including:
  detecting, using a relational database management system (RDBMS)-based adaptor, changes to metadata in a metadata store, the RDBMS-based adaptor incorporating one or more aspects of a change data capture (CDC) source connector;
  generating, based on the detected changes, an event queue indicating a plurality of change events associated with system objects, each respective change event of the plurality of change events indicating a system object associated with the respective change event and a number of event attributes of the respective change event, the event queue incorporating one or more aspects of an event bus topic associated with a stream processing application;

storing raw system data corresponding to the system objects in a data repository, wherein the data repository is a data lake;

identifying, using a consumer associated with the stream processing application, recent events among the plurality of change events based on a first event attribute of the number of event attributes, wherein the first event attribute is a timestamp indicative of a time that the respective change event occurred, wherein each of the recent events occurs during a specified time window, and wherein identifying the recent events includes identifying a most recent timestamp within the specified time window;

identifying relevant events among the recent events based on a second event attribute of the number of event attributes;

extracting unique identifiers from the relevant events based on a third event attribute of the number of event attributes;

identifying priority objects among the system objects based on the unique identifiers, each of the priority objects associated with at least one of the recent events and at least one of the relevant events;

selectively obtaining, from the metadata store, current metadata for ones of the system objects, the selectively obtaining including:

obtaining current metadata for each of the system objects identified as priority objects; and refraining from obtaining current metadata for system objects that are not associated with at least one of the recent events and at least one of the relevant events; and updating registry values associated with the priority objects in a metadata registry immediately upon obtaining the current metadata from the metadata store, the updating occurring in at least near real-time with the changes to the priority objects corresponding to the detected changes to the metadata in the metadata store.

* * * * *